United States Patent [19]
Kishida

[11] 4,431,859
[45] Feb. 14, 1984

[54] BUSHING FOR GAS-INSULATED ELECTRICAL EQUIPMENT

[75] Inventor: Mitsuhiro Kishida, Itami, Japan

[73] Assignee: Mitsubishi Denki Kabushiki Kaisha, Tokyo, Japan

[21] Appl. No.: 322,665

[22] Filed: Nov. 18, 1981

[30] Foreign Application Priority Data

Nov. 27, 1980 [JP] Japan .................................. 55-168911
Dec. 11, 1980 [JP] Japan .................................. 55-176738
Dec. 11, 1980 [JP] Japan .................................. 55-176739

[51] Int. Cl.³ ..................... H01B 17/26; H01B 17/36; H01B 17/42
[52] U.S. Cl. .................................. 174/31 R; 174/142; 174/209
[58] Field of Search ........ 174/11 BH, 12 BH, 15 BH, 174/16 BH, 18, 31 R, 142, 143, 152 R, 167, 209

[56] References Cited

U.S. PATENT DOCUMENTS 2,089,284  8/1937  Milliken ........................... 174/76 X

FOREIGN PATENT DOCUMENTS 583281   9/1959  Canada ........................... 174/31 R
668232  11/1938  Fed. Rep. of Germany .... 174/31 R
2627653  1/1977  Fed. Rep. of Germany .... 174/31 R
357781  12/1961  Switzerland ....................... 174/167
616265   3/1980  Switzerland ..................... 174/31 R
707858   4/1954  United Kingdom ............... 174/167

OTHER PUBLICATIONS

*EPRI Journal,* Oct. 1979, R&D Status Report of the Electrical Systems Division, p. 48, column 3 to p. 49, end of column 2.

*Primary Examiner*—Laramie E. Askin
*Attorney, Agent, or Firm*—Wenderoth, Lind & Ponack

[57] ABSTRACT

The invention comprises a bushing surrounding an electrical conductor, including a porcelain tube which employs a gaseous insulator, an insulating tube disposed with a space of small volume set relative to the inner periphery of the porcelain tube, the small space being filled with an insulating medium which is deformable with a predetermined force. According to the construction, when the porcelain tube has been damaged, its fragments can thus be prevented from scattering far. The flashover of the bushing can be prevented by disposing compression springs in the lower part of the insulating tube, and the electric field distribution of the outer surface of the bushing can be improved by coating the surface of the insulating tube with an electrically-conductive coating material.

10 Claims, 4 Drawing Figures

FIG. 1
FIG. 2
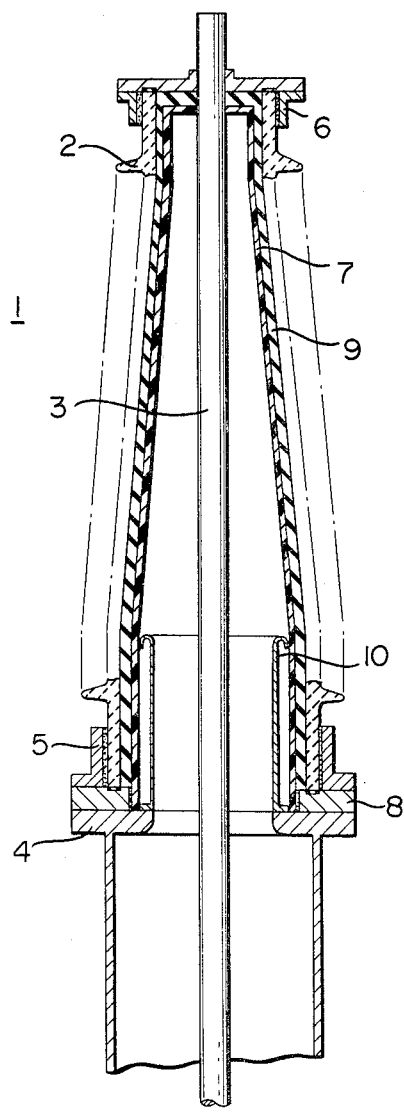
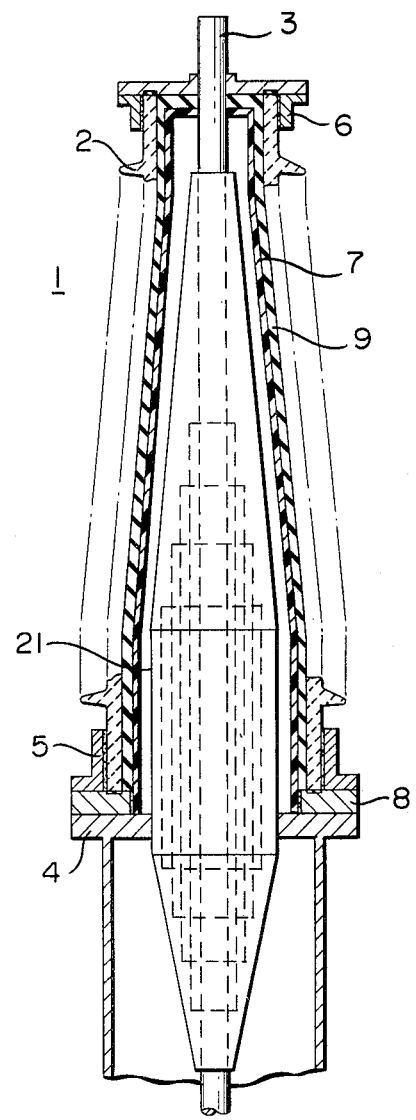

ELECTRICALLY CONDUCTIVE MATERIAL

BUSHING FOR GAS-INSULATED ELECTRICAL EQUIPMENT

BACKGROUND OF THE INVENTION

This invention relates to improvements in a bushing which is used for electrical equipment filled with an insulating material. The interior of the bushing communicates with that of a vessel receiving the electrical equipment therein, and is filled with a gaseous insulator under a high pressure. It is therefore feared that, when a porcelain tube or wall tube insulator constituting the bushing becomes damaged, its fragments will scatter around to cause a secondary accident wherein the porcelain tubes of the adjoining bushings will be damaged in a chain reaction. There has not been any prior-art bushing with a structure appropriate for preventing such accidental damage to the porcelain tubes.

SUMMARY OF THE INVENTION

This invention has for its object to provide a bushing of a novel structure which is so improved that the fragments of a porcelain tube do not scatter far when any accidental damage to the bushing has occurred. More specifically, an insulating tube is disposed inside the porcelain tube with a space of small volume set therebetween, and the small interspace is filled with an insulating medium deformable with a predetermined force, thereby to reduce emission energy in the case of damage to the porcelain tube. In addition, according to this invention, compression springs are disposed in the lower part of the insulating tube. This can increase the insulation distance of the porcelain of the porcelain tube, and serves to prevent the flashover of the bushing which is one of the causes of accidental damage to the bushing. Further, a predetermined portion of the surface of the insulating tube is coated with an electrically conductive coating material. This serves to improve an electric field distribution on the outer surface of the bushing.

BRIEF DESCRIPTION OF THE DRAWINGS

FIG. 1 is a sectional elevation showing an embodiment of this invention;

FIG. 2 is a sectional elevation showing another embodiment;

In the drawings, the same reference numerals respectively indicate corresponding parts.

DESCRIPTION OF THE PREFERRED EMBODIMENTS

Figure 3:
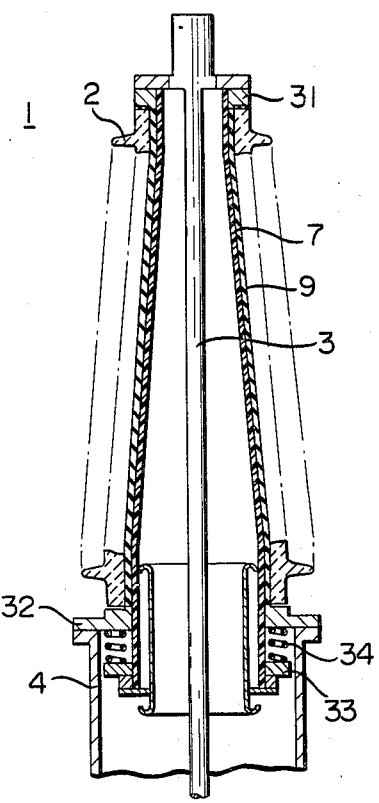
FIG. 3 is a sectional elevation showing still another embodiment.

In general, a bushing containing a gaseous insulator therein is provided with an electrode therein to moderate the concentration of electric field and is filled with an insulating gas such as SF$_6$ gas under a suitable pressure in order that a required dielectric strength may be attained under the restricted conditions of the interior of the bushing. Such a bushing which employs a gaseous insulator is used for gas-filled electrical equipment and is installed in a substation etc. When the porcelain tube of a particular bushing has become damaged due to any internal or external cause, its fragments are scattered by pressure energy stored in the gaseous insulator in the interior of the bushing and collide with and damage the other sound bushings around the damaged bushing. There is even the fear of an accident in which the breakdown of one bushing proceeds to initiate chain reaction on account of the scattered fragments so as to ruin all the bushings disposed in the substation.

This invention has been made in order to eliminate the disadvantage described above.

Hereunder, this invention will be described with reference to the drawings. In an embodiment of FIG. 1, a bushing 1 which includes a wall tube insulator or porcelain tube 2 is placed and fixed on the bushing seat 4 of the electrical equipment so that a conductor 3 of the device is arranged at the center of the wall tube insulator 2. A fitting flange 5 for fixing bushing 1 is mounted on the outer peripheral surface of the lower end part of the wall tube insulator 2, while a fitting flange 6 for closing up the top opening of the wall tube insulator 2 is mounted on the outer peripheral surface of the upper end part of the wall tube insulator 2. The interior of the wall tube insulator 2 communicates with that of the electrical equipment, and is filled with a gaseous insulator such as SF$_6$. Inside the wall tube insulator 2, an insulating tube 7 molded of an insulating material such as synthetic resin is fixed to the seat 4 with a fixture 8. The insulating tube 7 is arranged along the inner periphery of the wall tube insulator 2 so as to define a space of small volume between the outer periphery of the insulating tube 7 and the inner periphery of the wall tube insulator 2. The small interspace is filled with an insulating compound 9 such as asphalt or pitch. Thus, when the wall tube insulator 2 has broken due to any cause, the emission energy of the fragments thereof while scattering can be reduced and the scattering distances of the fragments can be restrained. An electric-field adjusting electrode 10 which is disposed inside the lower part of the insulating tube 7 functions to make uniform an electric field in the diametrical direction of the central conductor 3, thereby to make the electric field of the surface of the wall tube insulator 2 uniform. When a material which is semisolid and exhibits a high viscosity at the normal temperature, such as the compound of asphalt employed in the embodiment, is chosen as the material 9 to fill the interspace between the wall tube insulator 2 and the insulating tube 7, the sealed structure of the insulating tube portion is simplified in comparison with a structure filled with a liquid insulating medium such as synthetic insulating oil or mineral insulating oil. Moreover, the filling operation is simplified, and the handling is facilitated. The structure of the embodiment has the effect that, when the wall tube insulator 2 has broken down, small broken pieces fall directly below without scattering because the inner surface of the wall tube insulator 2 is bonded with the compound, so the breakdown does not affect sound bushings adjoining the bushing 1.

When the compound is replaced with a filler such as a liquid insulating filler containing a hardener which becomes flexible or rubbery (elastic) upon hardening after the filling, such as epoxy resin or polyurethane resin, the handling including transportation is facilitated.

FIG. 2 shows another embodiment, in which parts corresponding to those of the embodiment of FIG. 1 are assigned the same reference numerals. In the present embodiment, this invention is applied to a condenser bushing, and a laminated product 21 with an electrode and an insulator layered alternately is disposed as the central conductor. The present embodiment also has the effects described in detail in connection with the embodiment of FIG. 1.

FIG. 3 shows another embodiment in which compression springs are disposed under a wall tube insulator. In each of the foregoing embodiments shown in FIGS. 1 and 2, the wall tube insulator 2 of the bushing 1 has the fittings 6 and 5 mounted on the outer peripheral surfaces of the upper and lower end parts thereof, respectively. In contrast, the embodiment of FIG. 3 is so constructed that the wall tube insulator is fixed with fittings abutting on both the upper and lower end faces of the wall tube insulator. More specifically, the insulating tube 7 is set to be longer than the wall tube insulator 2, the fittings 31 and 32 are respectively caused to abut on the upper and lower end faces of the wall tube insulator 2, and the wall tube insulator 2 held between the fittings is placed and fixed on the seat 4. Further, a keeper fitting 33 is disposed on the outer peripheral surface of the lower part of the insulating tube 7, and the plurality of compression springs 34 are inserted between the keeper fitting 33 and the lower fitting 32 in a manner to surround the insulating tube 7. Thus, the porcelain tube 2 is given an intense compressive force by the springs 34 with the insulating tube 7 serving as a tensile member, and porcelain tube 2 is made unitary with the insulating tube 7 along with the upper fitting 31 as well as the lower fitting 32. Moreover, since no fitting is mounted on the outer peripheral surfaces of the upper and lower end parts of the wall tube insulator 2, the total length of the wall tube insulator 2 entirely contributes to insulation, so that the length of the porcelain portion of the wall tube insulator 2 becomes the insulation length. In addition, the upper fitting 31 and the lower fitting 32 can be assembled with small lengths. These bring forth the effect that the whole bushing can be made small in size and light in weight. Furthermore, since the wall tube insulator 2 is of the "center clamp type," a bending stress responsive to a bending mechanical force acting on the bushing 1 during operation does not become great, but the bending mechanical force turns mostly into a compressive force. Therefore, the wall tube insulator 2 can be prevented from breaking down.

Figure 4:
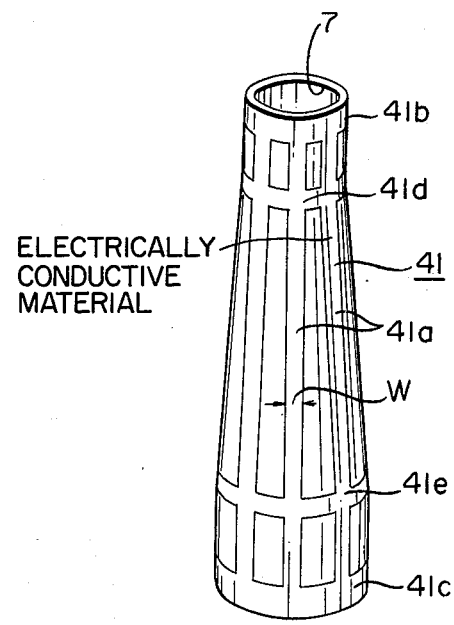
FIG. 4 is a perspective view showing an embodiment of an insulating tube.

Now, FIG. 4 is a persective view showing an embodiment of an insulating tube 7 for use in the bushing of this invention. In the embodiment of FIG. 4, the surface of the insulating tube 7 is coated with an electrically-conductive coating material 41 so as to cause leakage current to flow on the surface. Thus, a forcible voltage distribution is established to improve an electric field distribution on the surface of the porcelain tube. More specifically, in the bushing, when a high voltage is applied to the central conductor, an electric field concentrates in the vicinity of the lower fitting. Therefore, the electric-field adjusting electrode 10, etc. are disposed as illustrated in FIGS. 1 to 3. In order to attain a satisfactory effect of moderating the electric field, a shield ring is sometimes disposed around the porcelain tube. In the present embodiment, as stated above, the insulating tube is coated with the electrically-conductive coating material to improve the electric-field distribution and to enhance the ability of the porcelain tube to withstand high voltages. The electrically-conductive coating material is, for example, a coating material in which carbon and an epoxy or phenolic resin are mixed in an appropriate proportion. The shape of the insulating tube 7 is a shape extending along the inner periphery of the porcelain tube 2, and is usually the so-called tapered shape in which the upper part has a narrow diameter and the lower part has a wide diameter. In case where the surface of the insulating tube 7 in this shape is uniformly coated with the electrically-conductive coating material, the resistance value in the height direction is inversely proportional to the diameter of the insulating tube 7, and the voltage allotment during operation is greater in the upper part. The resistance distribution varies depending upon the shape and dimensions of the porcelain tube 2, and accordingly the voltage distribution varies. The resistance value ought to be set in relation to the height of the porcelain tube 2 and a working voltage, at a magnitude at which the temperature rise ascribable to heat generated by the leakage current is stabilized at a small value without becoming very high. With an expedient in which the entire surface of the insulating tube 7 is coated, the resistance value needs to be determined in relation to the shape and dimensions of the porcelain tube 2 and the working voltage. As an alternative expedient, in the surface of the insulating tube 7, a plurality of vertical strip-like parts located at equal intervals and each having a suitable width (W) are coated with the electrically-conductive coating material 41 having an appropriate resistance value. The width (W) and number of the strips 41a to be coated with the electrically-conductive coating material are determined by the working voltage and dimensions of the porcelain tube. They also vary depending upon the resistance value of the electrically-conductive coating material. Since, however, it is difficult to set various resistance values and to manage various insulating tubes, the conditions of the coating (the width and the number of the strips) may be determined in conformity with the individual porcelain tubes. Thus, porcelain tubes having voltage distributions stable for the various conditions thereof including the shape and dimensions and the working voltage can be provided. The upper end part and lower end part of the insulating tube 7 are circumferentially coated with the electrically-conductive coating material as illustrated by coated surface parts 41b and 41c so as to facilitate the electrical connection with the respective fittings. Circumferential coated surface parts 41d and 41e are set at proper positions, for example, points at which the diameter changes or the intermediate points thereof, whereby the dispersion of the resistance distribution in the vertical direction ascribable to the coating state is moderated.

What is claimed is:

1. A bushing for gas-insulated electrical equipment having electrical conductors, comprising: a porcelain tube for surrounding a conductor penetrating through its central part and for containing a gaseous insulator, an insulating tube disposed inside said porcelain tube and extending in spaced parallel relation with an inner peripheral surface of said porcelain tube, and and insulating medium made of a semisolid insulating compound of high viscosity deformable with a predetermined force filling the interspace between said porcelain tube and said insulating tube.

2. A bushing as defined in claim 1, wherein said insulating medium comprises asphalt.

3. A bushing as defined in claim 1, wherein said insulating medium comprises pitch.

4. A bushing as defined in claim 1, wherein said insulating tube is formed of an electrically insulating material.

5. A bushing as defined in claim 4, wherein said electrically insulating material comprises a synthetic resin.

6. A bushing for gas-insulated electrical equipment having electrical conductors, comprising: a porcelain tube for surrounding a conductor and for containing a gaseous insulator; an insulating tube disposed inside said porcelain tube and extending in spaced relation with an inner peripheral surface of said porcelain tube; and means, including a semisolid electrically insulating material of high viscosity, deformable with a predetermined force, filling the interspace between said porcelain tube and said insulating tube and bonded to said insulating tube, for preventing pieces of said porcelain tube from scattering radially in response to breakage of said porcelain tube and so that small broken pieces of said porcelain tube fall directly below without scattering in response to said breakage.

7. A bushing for electrical equipment, comprising: a porcelain tube for surrounding a conductor penetrating through its central part and for containing a gaseous insulator; an insulating tube disposed inside said porcelain tube and extending in spaced parallel relation with an inner peripheral surface of said porcelain tube; an insulating medium made of a filler deformable with a predetermined force filling the interspace between said porcelain tube and said insulating tube; an upper fitting disposed at an upper part of said insulating tube in contact with an upper end face of said porcelain tube; a lower fitting disposed at a lower part of said insulating tube in contact with a lower end face of said porcelain tube and holding said porcelain tube between said lower fitting and said upper fitting; a keeper fitting disposed at a part of said insulating tube below said lower part; compression springs maintained by said keeper fitting between said keeper fitting and said lower fitting; and an electrically conductive coating, coating a surface of said insulating tube, one end side of said coating being for electrically connecting to a central conductor, the other end side of said coating being electrically connected to said lower fitting.

8. A bushing as defined in claim 7, wherein said coating comprises a plurality of electrically conductive strip-like parts coating said insulating tube between the upper end and lower ends thereof.

9. A bushing for gas-insulated electrical equipment having electrical conductors, comprising: a porcelain tube for surrounding a conductor penetrating through its central part and for containing a gaseous insulator, an insulating tube disposed inside said porcelain tube and extending in spaced parallel relation with an inner peripheral surface of said porcelain tube, and an insulating medium made of a filler deformable with a predetermined force filling the interspace between said porcelain tube and said insulating tube, wherein an upper part of said insulating tube is fixed to an upper part of said porcelain tube, said bushing further comprising springs for urging said porcelain tube in a predetermined direction, disposed at a lower part of said insulating tube.

10. A bushing for gas-insulated electrical equipment having electrical conductors, comprising: a porcelain tube for surrounding a conductor penetrating through its central part and for containing a gaseous insulator, an insulating tube disposed inside said porcelain tube and extending in spaced parallel relation with an inner peripheral surface of said porcelain tube, and an insulating medium made of a filler deformable with a predetermined force filling the interspace between said porcelain tube and said insulating tube, said bushing further comprising an upper fitting disposed at an upper part of said insulating tube in contact with an upper end face of said porcelain tube, a lower fitting disposed at a lower part of said insulating tube in contact with a lower end face of said porcelain tube and holding said porcelain tube between said lower fitting and said upper fitting, a keeper fitting disposed at a part of said insulating tube below said lower part in a fixed position relative to said insulating tube, and compression springs maintained by said keeper fitting between said keeper fitting and said lower fitting.

* * * * *